United States Patent [19]

Arway et al.

[11] Patent Number: 4,555,719

[45] Date of Patent: Nov. 26, 1985

[54] INK VALVE FOR MARKING SYSTEMS

[75] Inventors: George Arway, Norridge; Frank Eremity, Hanover Park; Tung M. Huang, Elk Grove Village, all of Ill.

[73] Assignee: Videojet Systems International, Inc., Elk Grove Village, Ill.

[21] Appl. No.: 524,658

[22] Filed: Aug. 19, 1983

[51] Int. Cl.[4] .............................................. G01D 15/16

[52] U.S. Cl. ................................ 346/140 R; 137/510; 239/533.15; 239/570; 346/75

[58] Field of Search ............. 346/140 R, 75; 137/510; 239/570, 533.15, 533.1

[56] References Cited

U.S. PATENT DOCUMENTS

| | | | |
|---|---|---|---|
| 2,103,725 | 12/1937 | Jacobsson | 137/510 |
| 2,286,713 | 6/1942 | Burks | 137/510 X |
| 2,639,194 | 5/1953 | Wahlin | 239/533.15 |
| 2,825,602 | 3/1958 | Rabbitt | 239/533.15 X |
| 3,341,860 | 9/1967 | Schweitzer | 346/140 |
| 3,371,350 | 2/1968 | Sanderson | 346/140 |
| 3,761,953 | 9/1973 | Helgeson et al. | 346/75 |
| 3,930,258 | 12/1975 | Dick et al. | 346/75 |
| 3,961,337 | 6/1976 | Jung et al. | 346/140 |
| 4,023,182 | 5/1977 | Arway et al. | 346/75 |
| 4,067,020 | 1/1978 | Arway | 346/75 |
| 4,089,007 | 5/1978 | Perry | 346/140 |
| 4,121,222 | 10/1978 | Diebold et al. | 346/75 |
| 4,187,512 | 2/1980 | Matsunaga | 346/140 |
| 4,234,885 | 11/1980 | Arway | 346/140 |

FOREIGN PATENT DOCUMENTS 2105495 1/1982 United Kingdom .

OTHER PUBLICATIONS

Baker et al; Improved Ink Shut-Off Valve for Ink Jet Printers; vol. 23, No. 7A, IBM TDB, Dec. 1980, pp. 2884–2885.

Bivco Valve Corp., Poppet Type Valve Brochure.

Humphrey Valves, Vacuum Valves Brochure.

Circle Seal Controls; Check Valves 100 Series Brochure, Anaheim, Calif., 1978.

*Primary Examiner*—Joseph W. Hartary

*Attorney, Agent, or Firm*—McDougall, Hersh & Scott

[57] ABSTRACT

A fast acting ink valve adapted to be used in conjunction with the nozzle of an ink jet printing system is disclosed. A flexible diaphragm modulates flow through a valve chamber. A spring biases the diaphragm to a sealed position to prevent flow. Ink pressure in the marking system unseals the diaphragm permitting flow. Unlike check valves, the invention has minimal pressure drop due to the location of the bias spring outside the ink flow path.

7 Claims, 4 Drawing Figures

INK VALVE FOR MARKING SYSTEMS

BACKGROUND OF THE INVENTION

This invention relates to specialized valves for use in pressurized fluid systems. More specifically, it relates to liquid marking systems wherein ink is applied in droplets or a stream of material to various surfaces for marking purposes. Such systems are often referred to as drop on demand or ink jet marking or printing systems. Typically, ink is pressurized and forced through a nozzle to create tiny drops which may be controlled electrostatically or otherwise to determine where and when they will strike the article to be marked. Drop on demand systems create and project drops toward the article to be marked only when marking is to be done.

For brevity throughout the specification such systems, regardless of type, will be referred to as ink jet systems. Ink jet printing equipment is used for many industrial marking applications as, for example, date coding on food and beverage packing lines, addressing magazine labels, and the like. An important requirement of such systems is that the print head, containing the ink nozzle or orifice which forms the droplets or a stream of marking material, be located remotely from the ink supply and control electronics. Thus, the print head is usually supplied with ink from a centralized ink supply via a flexible conduit of some length, on the order of ten to thirty feet.

An effective ink jet system must be able to control (turn on and off) the supply of ink to the nozzle rapidly and accurately. In addition, the control or shut off device, usually a valve, must prevent two phenomena which adversely affect print quality. The first is referred to as "drool" wherein during a nonprinting period the depressurized ink supply line is not effectively shut off, permitting the nozzle to drip resulting in unacceptable printing when the nozzle resumes operation. The second phenomenon is the reverse of the first. Back pressure can cause entry of air into the nozzle. This too results in unacceptable operation including missed information.

In the prior art several approaches to controlling the flow of ink to the nozzle have been employed. One such prior approach (see U.S. Pat. No. 4,067,020) is a pneumatically controlled valve located close to the nozzle. This valve, controlled by a separate source of air pressure, provides acceptable ink flow gating but, due to its size and complexity, interferes with the desire to minimize the dimensions of the print head.

A second prior art approach is to locate the ink valve remotely from the print head. With this approach, however, it is necessary to take into account the pressure build up in the walls of the flexible conduit connecting the ink supply to the nozzle. When the ink flow is stopped the energy stored in the flexible conduit walls must be dissipated or drool will occur contaminating the print head, particularly in the case of electrostatic systems. To deal with the energy stored in the conduit walls the prior art has employed a three way valve which, when ink flow is stopped, has a vent port through which the pressure in the conduit walls is dissipated by permitting ink to pass therethrough. This approach is not entirely satisfactory because the valve position relative to the nozzle must remain fixed. If not, shut off cycles will be slow and drool and/or suction will occur.

A third prior technique (see U.S. Pat. No. 4,234,885), locates the ink valve at the ink supply rather than adjacent the print head. To prevent the storage of energy in the flexible conduit walls a pressure jacket is provided surrounding the conduit. This system is somewhat complex and expensive.

All of the foregoing prior art techniques, in addition to the drawbacks mentioned, must be provided with a separate control medium, such as electric or pneumatic control.

It is desirable to provide an improved valve system for controlling a supply of ink to a print head which overcomes these disadvantages. More specifically, it is an object of the invention to provide a small, high speed valve which can be mounted near, preferably adjacent, the ink jet nozzle. Such a design obviates the need for a pressure jacket surrounding the ink conduit and permits a reduction in the size of the print head facilitating use of the ink jet marking system in many additional applications. It is further desirable to develop a valve which does not require a separate control medium.

It is accordingly an object of the present invention to provide such a small, simple valve which is low in cost but has a high performance level.

It is a further object of the invention to provide a valve which can be mounted near the ink jet nozzle and which does not require a separate control medium but rather operates as a function of pressure in the ink supply conduit.

Another object of the invention is to provide an ink valve which has a high cracking pressure to prevent drool and which has a negligible pressure drop across the valve.

Other objects and advantages of the invention will be apparent from the remaining portion of the specification.

SUMMARY OF THE INVENTION

The invention is a valve for use in an ink jet system which stops and starts the flow of ink to the print head with high speed precision. The valve is simple and compact enough to be mounted adjacent the nozzle of the print head. The valve includes an inlet port and an outlet port through which the pressurized supply of ink must pass. Disposed in sealing relation between the inlet and outlet ports is a flexible diaphragm which coacts with a sealing surface to interrupt ink flow. The diaphragm is normally biased to the sealing position by a spring located outside of the fluid path. In essence, the biasing means is at atmospheric pressure and is unaffected by pressure changes in the fluid flow system.

Valve actuation is accomplished by modulating the flow pressure in the system whereby when the pressure exceeds the bias of the spring (commonly referred to as the cracking pressure of the valve), the diaphragm moves away from the sealing surface and permits flow through the valve. Once biased to the open position, due to the diaphragm's large surface area, the ink flow easily maintains the diaphragm in the open position with only a negligible drop in pressure. To close the valve it is only necessary to reduce the pressure in the ink conduit below the cracking pressure or bias force of the spring. The diaphragm will then snap shut against the sealing surface.

DETAILED DESCRIPTION

Figure 1:
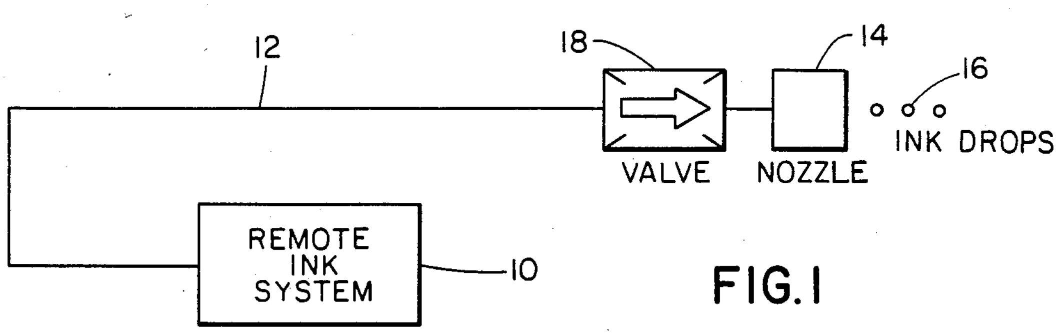
FIG. 1 is a generalized block diagram of an ink marking system for which the present invention is intended.

Referring to the drawings and in particular FIG. 1, an ink drop marking system involves the use of a remote system 10 supplying ink via a flexible conduit 12 to a print head 14 employing a nozzle to form ink drops 16 which can be directed onto a surface to be marked by various techniques. See, for example, the disclosures contained in U.S. Pat. Nos. 4,121,222 and 4,234,885. According to the present invention the supply of ink from the remote system 10 to the print head 14 is controlled by a high speed valve 18, preferably located near the print head. In a preferred embodiment the valve 18, which may be quite small in size (on the order of one cubic inch), will be located in the print head 14 immediately upstream of the nozzle. It is possible, of course, to locate the valve elsewhere in the system and obtain the benefits of the invention. For example, if desired, the valve could be located in the vicinity of the remote ink system 10 but, in that case, it would be necessary to employ a pressurized jacket around the conduit 12 to prevent energy storage in the conduit. (See, for example, U.S. Pat. No. 4,234,885.)

It should be noted that the valve 18 of the present invention requires no external electric control or pneumatic air system to operate. Rather it is an in line valve operated solely by the pressure variation in the ink conduit 12. In one embodiment of an ink jet system, ink is supplied to the print head 14 at a pressure on the order of 40 psig. It is desired, in order to have a fast response characteristic, that the valve according to the invention have a relatively high cracking pressure and, for example, a satisfactory valve according to the invention has been constructed with a cracking pressure (sealing force) on the order of 20 psig. Unlike a check valve, however, this cracking pressure does not cause a substantial pressure drop across the valve and, for example, in a typical construction according to the invention the inlet to outlet pressure drop would be on the order of 1 or 2 psig.

Figure 2:
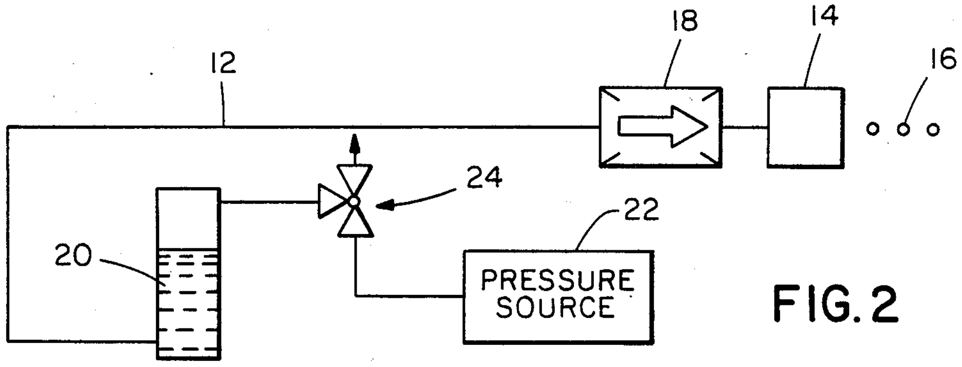
FIG. 2 is a block diagram of a preferred embodiment of the generalized system of FIG. 1.
Figure 3:
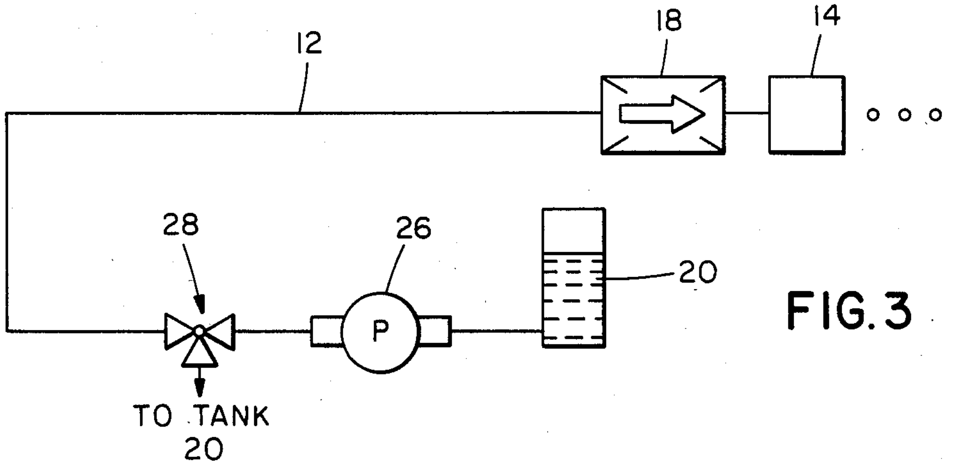
FIG. 3 is an alternative embodiment of the generalized system of FIG. 1.

FIGS. 2 and 3 illustrate specific embodiments of an ink jet system employing the valve according to the invention. In the FIG. 2 system an ink supply tank 20 is pressurized from a pressure source 22 via a three way valve 24. When it is desired to produce ink drops from the print head 14, valve 24 is positioned to permit the pressure source 22 to pressurize the tank 20 and, in turn, the conduit 12. When the pressure in the conduit 12 exceeds the cracking pressure of valve 18, the diaphragm snaps open, permitting ink to flow to the print head to form ink drops. Flow is stopped by repositioning the three way valve 24 to vent the pressure from source 22 to the atmosphere. This causes the ink valve 18 to discontinue ink flow as soon as the pressure in the conduit drops below the cracking pressure.

In FIG. 3 an alternative system is illustrated. The tank 20 has ink pumped from it by a mechanical pump 26. The pump supplies the ink to the conduit 12 via a three way valve 28. When it is desired to stop ink flow, the three way valve directs the ink back to the tank 20 and permits the conduit 12 to rapidly depressurize whereby the ink valve 18 shuts off flow to the nozzle.

Figure 4:
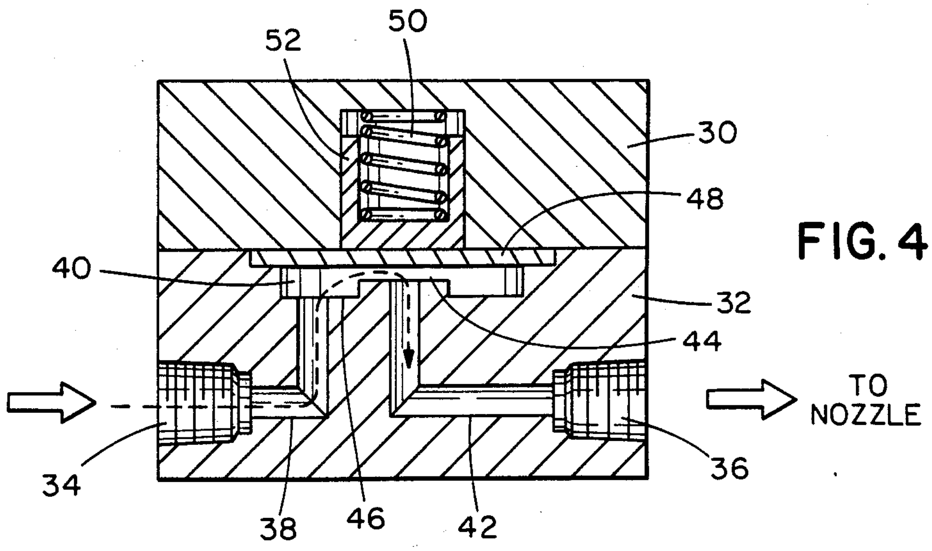
FIG. 4 is a cross sectional view of the valve according to the invention.

Referring to FIG. 4, the details of the ink valve according to a preferred embodiment of the invention are illustrated. The valve, which may be formed of high quality plastic materials or metal, includes an upper housing 30 and a lower housing 32. Disposed in the lower housing is an inlet port 34 and an outlet port 36. The inlet and outlet ports communicate via conduit 38, valve chamber 40 and conduit 42.

Preferably, valve chamber 40, as viewed in FIG. 4, has a central raised portion or sealing surface 44 surrounded by an annular depressed portion 46. The conduit 38 enters the chamber through the depressed portion while the conduit 42 leaves the chamber from the raised portion 44.

Disposed over the chamber 40 is a flexible diaphragm 48 which is secured in sealing relation thereon between the upper and lower housings. This diaphragm, formed of a suitable elastomeric material, can be flexed towards and away from the raised portion 44 to seal the conduit 42 or permit flow thereto, respectively.

A biasing element, according to a preferred embodiment, is a spring assembly located in the upper housing 30. The spring assembly includes a coil spring 50, the upper end of which is secured against the housing. Surrounding the spring is a cup shaped pusher member 52 which is movable relative to the upper housing 30 in an appropriately sized opening provided therefor. The pusher member 52 is positioned over the central portion of the diaphragm 48 and, as will be apparent, when the upper and lower housings are securely joined, the pusher member will exert a downward, sealing force on the diaphragm 48. The amount of force is a function of parameters of the spring 50 which can be carefully controlled in a number of ways. Usually it will be sufficient merely to select a spring having a force sufficient to seal the outlet against the back pressure. If desired, however, additional adjustment can be provided by utilizing a means for increasing spring force as, for example, a screw and plate assembly mounted at the top of the upper housing to reduce the space in which the spring is captured.

In any case, the pusher member 52 will exert pressure on the diaphragm causing it to contact the sealing surface 44 of the chamber 40. Thus, the valve is normally closed and will not permit flow between the inlet and outlet ports. While the sealing surface 44 is preferably raised, it could be level with the annular depressed portion 46 and still function as intended. Specifically, the portion of the chamber surface opposite the pusher member 52 would constitute the sealing surface.

The valve opens when the ink in the supply conduit is pressurized sufficiently to exceed its cracking pressure (force produced by the spring 50 acting over the sealing surface 44). Specifically, when the ink pressure exceeds the spring force, the diaphragm moves away from the surface 44 permitting ink flow to the nozzle. The surface area of the diaphragm is chosen with the understanding that a particular inlet pressure against it will overcome the selected spring force. Also, the diaphragm should be free to flex in the immediate vicinity of the inlet into the chamber 40. Thus, the ink pressure is permitted to act over a substantial portion of the diaphragm consistent with well known principals of hydraulics. It will be appreciated that the design of the chamber 40 is intended to minimize pressure loss.

When the ink supply in the conduit is depressurized the diaphragm snaps shut preventing any back flow of ink which would cause air to enter the nozzle of any further forward flow of ink which would cause drool.

The high speed ink valve according to the invention should have a high cracking pressure (in excess of 10 psi for a typical system) but minimal pressure drop across the valve. Furthermore, the valve must have a biasing element holding the valve closed when not operating to prevent drool or suction.

Prior art valves, such as check valves, have a spring bias but it is in the path of the pressurized fluid. The spring, therefore, provides measurable opposition to the forward flow of fluid after the valve is open resulting in a pressure drop between the inlet and outlet ports approximately equal to the cracking pressure of the valve. This is highly undesirable for the purposes of the present invention because the pressures necessary for an ink jet system must remain relatively stable. In sum, while a check valve does employ a spring to provide static sealing, its spring force creates a permanent pressure drop penalty requiring higher pressures in the conduit to obtain a desired pressure at the print head. This would add an undesirable hysteresis to an ink jet system. Prior art valves without a spring bias would be unable to provide the high cracking pressure to prevent drool and/or air suction.

The present invention has a high cracking pressure but, once the valve snaps open, the cracking pressure does not cause a significant pressure drop across the valve. In effect, the invention maintains the spring bias out of the fluid path resulting in a high efficiency valve having a negligible pressure drop through the chamber 40.

While we have shown and described embodiments of this invention in some detail, it will be understood that this description and illustrations are offered merely by way of example, and that the invention is to be limited in scope only by the appended claims.

What is claimed is:

1. A system for controllably supplying ink to a remotely located drop marking nozzle comprising:

(a) an ink reservoir having a supply of ink therein, (b) a drop marking nozzle remotely located from the ink reservoir and in communication therewith by means of a flexible fluid conduit, (c) means for pressurizing said reservoir to deliver ink from the reservoir to the nozzle via said conduit and for depressurizing said reservoir to terminate ink flow and release the energy stored in the walls of the flexible fluid conduit, (d) valve means adjacent said nozzle responsive solely to pressure variations in the fluid conduit, for preventing ink flow and nozzle drool when the fluid pressure in said conduit is below a selected value and for permitting ink flow to the nozzle when the fluid pressure is above said selected value.

2. A system for controllably supplying ink to a remotely located drop marking nozzle comprising:

(a) an ink reservoir having a supply of ink therein, (b) a drop marking nozzle remotely located from the ink reservoir and in communication therewith by means of a fluid conduit, (c) means for selectively pressurizing and depressurizing said reservoir to control the delivery of ink from the reservoir to the nozzle, (d) valve means adjacent said nozzle responsive solely to pressure variations in the fluid conduit, for preventing ink flow and nozzle drool when the fluid pressure in said conduit is below a selected value and for permitting ink flow to the nozzle when the fluid pressure is above said selected value, said valve means including:

(i) a housing containing a valve chamber through which the ink flows, said chamber having a sealing surface, (ii) inlet and outlet means for conveying ink into and out of the valve chamber, (iii) a flexible member disposed over the chamber and capable of flexing between a first position permitting ink flow through the chamber and a second position engaging said sealing surface to prevent ink flow, and (iv) means for biasing the flexible member to the second position, said biasing means being positioned out of the ink path such that fluid pressure appears on only one side of said flexible member significantly reducing cracking pressure losses.

3. The system according to claim 2 wherein the valve is positioned remotely of the reservoir and adjacent the nozzle whereby its ability to control nozzle drool is optimized.

4. The valve construction according to claim 2 wherein said valve chamber includes:

(a) a raised portion containing said sealing surface and communicating with one of said inlet and outlet means, (b) a depressed portion surrounding said raised portion and communicating with the other of said inlet and outlet means.

5. A valve construction according to claim 2 wherein said flexible member is an elastomeric diaphragm secured in the housing over the valve chamber.

6. The valve construction according to claim 2 wherein the biasing means includes a spring member secured against the housing and acting on the flexible member.

7. The valve construction according to claim 2 wherein the biasing means includes a pusher element movable within the housing in which the spring is received, the pusher element contacting the flexible member to bias it toward the sealing surface.

* * * * *